United States Patent
Spagnola et al.

(10) Patent No.: US 11,548,964 B2
(45) Date of Patent: Jan. 10, 2023

(54) ONE-PART CURABLE SOFT FEEL COATINGS

(71) Applicant: Arkema France, Colombes (FR)

(72) Inventors: Lisa M. Spagnola, Richboro, PA (US); Jeffrey A. Klang, West Chester, PA (US); Manjuli Gupta, Easton, PA (US); Xavier Drujon, Paris (FR)

(*) Notice: Subject to any disclaimer, the term of this patent is extended or adjusted under 35 U.S.C. 154(b) by 0 days.

(21) Appl. No.: 15/750,710

(22) PCT Filed: Aug. 2, 2016

(86) PCT No.: PCT/EP2016/068374
§ 371 (c)(1),
(2) Date: Feb. 6, 2018

(87) PCT Pub. No.: WO2017/025380
PCT Pub. Date: Feb. 16, 2017

(65) Prior Publication Data
US 2019/0002616 A1    Jan. 3, 2019

Related U.S. Application Data

(60) Provisional application No. 62/202,195, filed on Aug. 7, 2015.

(51) Int. Cl.
| C08F 2/46 | (2006.01) |
| C08F 222/10 | (2006.01) |
| C08F 290/06 | (2006.01) |
| C08G 18/38 | (2006.01) |
| C08G 18/67 | (2006.01) |
| C09D 175/16 | (2006.01) |
| C09D 4/00 | (2006.01) |

(52) U.S. Cl.
CPC .......... *C08F 222/1065* (2020.02); *C08F 2/46* (2013.01); *C08F 290/061* (2013.01); *C08G 18/3831* (2013.01); *C08G 18/3853* (2013.01); *C08G 18/6755* (2013.01); *C09D 4/00* (2013.01); *C09D 175/16* (2013.01); *C08F 222/102* (2020.02); *C08F 222/103* (2020.02)

(58) Field of Classification Search
CPC .. C08F 2/46; C08F 222/1006; C08F 290/061; C08F 2222/1026; C08G 18/3831; C08G 18/3853; C08G 18/6755; C09D 175/16
See application file for complete search history.

(56) References Cited

U.S. PATENT DOCUMENTS

| 4,812,489 A * | 3/1989 | Watanabe | C08G 18/4854 522/42 |
| 5,932,625 A * | 8/1999 | Watanabe | C08F 2/44 264/239 |
| 6,143,803 A * | 11/2000 | Igarashi | C08F 220/26 430/281.1 |
| 8,587,861 B1 * | 11/2013 | Zhou | C09J 4/00 257/40 |
| 2005/0171231 A1 * | 8/2005 | Diggins | C09D 4/00 523/105 |
| 2012/0296001 A1 * | 11/2012 | Matsuura | C08F 2/44 522/152 |
| 2013/0202892 A1 * | 8/2013 | Kues | C08G 18/792 428/423.1 |

FOREIGN PATENT DOCUMENTS

| CN | 102850922 | 1/2013 | |
| DE | 202012012632 | 8/2013 | |
| JP | 5000123 | 1/1993 | |
| JP | 4778249 | 9/2006 | |
| JP | 2013035274 A | 2/2013 | |
| JP | 2014201596 | 10/2014 | |
| JP | 2014201596 A * | 10/2014 | .......... C09D 175/16 |
| WO | 2001029138 A1 | 4/2001 | |
| WO | 2002038688 A2 | 5/2001 | |
| WO | WO-2012089827 A1 * | 7/2012 | ......... C08G 18/4854 |

OTHER PUBLICATIONS

International Search Report. International Application No. PCT/EP2016/068374. dated Sep. 1, 2016.

* cited by examiner

*Primary Examiner* — Bijan Ahvazi
(74) *Attorney, Agent, or Firm* — Christopher R. Lewis

(57) ABSTRACT

One-part, curable compositions that have a soft feel when applied as a coating/film and cured, may include a) at least one isocyanurate tri(meth)acrylate or derivative thereof; and at least one of components b)-e), wherein: b) is at least one urethane diacrylate; c) is at least one monofunctional or difunctional reactive diluent; d) is at least one solvent; and e) is additives. The one-part, curable compositions are advantageous with respect to softness and tailorability of softness as well as other properties such as mar resistance, abrasion resistance, stain resistance and chemical resistance. Due to their advantageous properties, embodiments of the one-part, curable compositions described herein are viable for a wide range of coating applications including automotives, aeronautics, cosmetics, small appliances, packaging and consumer electronics. Methods of making and using the one-part, curable are also described herein.

21 Claims, No Drawings

ONE-PART CURABLE SOFT FEEL COATINGS

CROSS-REFERENCE TO RELATED APPLICATIONS

This application is a U.S. national stage application under 35 U.S.C. § 371 of PCT/EP2016/068374, filed Aug. 2, 2016, which claims the benefit under 35 U.S.C. § 119 of U.S. patent application Ser. No. 62/202,195, filed Aug. 7, 2015.

FIELD OF THE INVENTION

Embodiments described herein are directed to one-part, curable coatings with a soft feel or touch. Embodiments described herein are also directed to curable compositions comprising: a) at least one isocyanurate tri(meth)acrylate or derivative thereof; and at least one component selected from: b) at least one urethane diacrylate; c) at least one mono functional or difunctional monomer different from b) when c) is difunctional; d) at least one solvent; and e) additives. The one-part, curable compositions described herein are advantageous with respect to softness and tailorability of softness as well as other properties such as mar resistance, abrasion resistance, stain resistance and chemical resistance. Due to the advantageous properties, embodiments of the one-part, curable compositions described herein are viable for a wide range of coating applications including automotive, aeronautics, cosmetics, small appliances, packaging and consumer electronics.

BACKGROUND OF THE INVENTION

Products with a soft feel coating or soft touch coating are desirable due to their soft and warm feeling which provide a more pleasing, luxurious feel to plastic, metal or other hard substrates. Conventional soft feel coatings have been based upon solvent- or water-borne two-part systems with isocyanate based chemistry. While such coatings are advantageous with respect to feel, such coatings suffer from drawbacks including handling free isocyanates in coating (safety and exposure questions), limited shelf-life, long curing times and poor protective properties such as stain, chemical, abrasion and mar resistance. Electronics, consumer goods and vehicle manufacturers are some of the largest consumers of soft feel coatings. Apart from their unique tactile feeling, soft feel coatings also should present other aspect of properties to function constantly when frequent interactions between users and the coating surface happen. The aforementioned properties include robust adhesion to the substrate, improved chemical resistance such as to human sweat and personal care products, excellent scratch resistance and non-yellowing, especially when used as a coating.

CN 102850922 discloses a curable pigmented coating that can be used on electronics. The curable pigmented coating has an oligomer portion that is linear, mono or difunctional, at 32-37 wt % and monomer at 4-6 wt %.

DE 202012012632 discloses a curable soft feel coating for pen grips obtained with a mixture of difunctional oligomers and monofunctional monomers.

JP 5000123 discloses a curable soft feel coating using trifunctional urethane acrylate based on a caprolactone triol with a molecular weight (Mw) of 2500-4500 g/mol. This document also discloses formulating with other trifunctional monomers, such as with tri-and quad-functional polyols.

JP 4778249 discloses a curable leather pitch finish using a polymerizable silicone oligomer, crosslinked resin beads and a urethane acrylate oligomer containing polyester and caprolactone structure.

Two-part soft feel coatings based on solvent-borne polyurethanes using polyester or polyether polyols and isocyanates have been utilized. However and aside from the aforementioned drawbacks, increasing demand of more environmentally friendly coatings has pushed coating suppliers to provide new generation of water-borne two-part polyurethanes dispersions.

SUMMARY OF THE INVENTION

Meanwhile, continuous effort is being made to develop one-part soft feel coatings. Thus, there is a need for one-part soft feel coatings that are curable and avoid the aforementioned drawbacks of conventional two-part soft feel coatings.

Embodiments of the one-part, curable compositions comprising a tri(meth)acrylate derivative of isocyanurate described herein overcome at least some of the drawbacks associated with known conventional two-part soft feel coatings. As referred to herein, "one-part" compositions may be taken to mean systems in which the compositions are indefinitely stable until an outside energy source is applied to facilitate curing, i.e., no pot-life or shelf-life limitations, whereby the curing may be facilitated with radiation, heat or a combination of both. For a one-part curable composition, said composition is ready for cure and stable at storage as it is. For a two- part composition requires that two parts reactive between them are mixed and after mixing the composition is no more stable given that a reaction is occurring and evoluting in time with irreversible crosslinking between the two parts reactants. Pot life is referring to the limit life of the formulation due to reaction occurring and corresponds to the limited time to apply the coating as the reaction progresses.

In embodiments, the one-part, curable compositions described herein may comprise, consist of or consist essentially of: a) at least one isocyanurate tri(meth)acrylate or derivative thereof; and at least one of components b), c), d) or e), wherein: b) is at least one urethane diacrylate; c) is at least one monofunctional or difunctional reactive diluent different from b) (when c) is difunctional); d) is at least one solvent; and e) is additives. In embodiments, the one-part, curable compositions described herein comprise in addition to component a) at least one of components b) to e).

In embodiments, the a) at least one isocyanurate tri(meth) acrylate or derivative comprises tris(2-hydroxyethyl)isocyanurate triacrylate. In embodiments, the at least one tri(meth) acrylate derivative of isocyanurate is present in the composition from about 5% to about 80%, preferably from about 10% to about 50% by weight and most preferably from about 15% to about 50% by weight based on the weight of components a), b), c) and e) . In particular, said isocyanurate tri(meth)acrylate a) has a molecular weight of less than about 10000, preferably 5000 g/mol, more preferably less than about 4000 g/mol and most preferably less than about 3000 g/mol and even most preferably less than about 2000 g/mol. In embodiments, the a) at least one isocyanurate tri(meth)acrylate or derivative thereof may be represented by the formula:

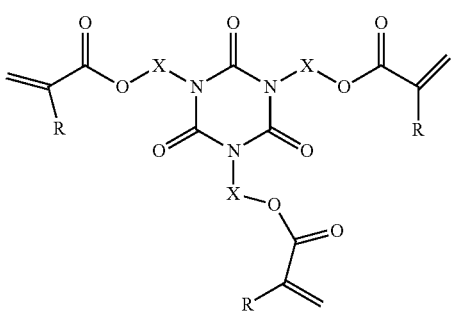

wherein R may be H or Me; and X may be an alkylene chain —(CH$_2$)$_n$— wherein n=2-10 or X may be an alkylene group further modified by alkoxylation with ethylene oxide or propylene oxide or a combination thereof or X may be an alkylene chain further modified by addition of caprolactone or lactide or a combination thereof.

In another embodiment, the a) at least one isocyanurate tri(meth)acrylate or derivative thereof may be represented by the formula:

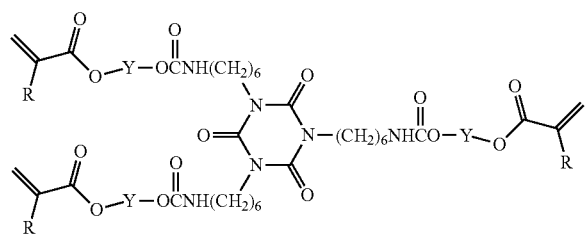

wherein R may be H or Me; and Y may be a branched or linear alkylene group of 2 to 4 carbon atoms or Y may be a branched or linear alkylene group alkoxylated or caprolactone modified alkylene group further modified by alkoxylation with ethylene oxide or propylene oxide or a combination thereof or Y may be an alkylene chain further modified by addition of caprolactone or lactide or a thereof.

In embodiments, Y may be selected from the group consisting of —CH$_2$CH$_2$—, —CH$_2$CH(CH$_3$)—, CH$_2$CH$_2$CH$_2$—, —CH$_2$CH$_2$CH$_2$CH$_2$—, alkyl-(OC$_2$H$_4$)$_n$—, alkyl-(OC$_2$H$_3$(CH$_3$))$_n$—, alkyl-[(OC$_2$H$_4$)$_x$(OC$_2$H$_3$(CH$_3$))$_y$]$_n$—, alkyl-(OC(=O)C$_5$H$_{10}$)$_n$—, alkyl-(OC(=O)CH(CH$_3$)OC(=O)CH(CH$_3$))$_n$—, alkyl-[(OC(=O)C$_5$H$_{10}$)$_x$—(OC(=O)CH(CH$_3$)OC(=O)CH(CH$_3$))$_y$]$_n$ and combinations thereof.

In embodiments, the d) at least one solvent is selected from the group consisting of ketones, esters, carbonates, alcohols, alkanes, aromatics, ethers, amides, glycol ethers and combinations thereof. More particularly, d) is selected from the group consisting of methyl ethyl ketone, butyl acetate and combinations thereof. In embodiments, the e) additives are selected from the group consisting of photo-initiators, thermal free radical initiators, accelerators, tri-functional (different from a) or higher functionality (higher than 3) monomers, polymer waxes or beads, leveling agents, wetting agents, matting agents, colorants, dyes, pigments, slip agents, adhesion promoters, fillers, rheology modifiers, thixotropic agents, plasticizers, UV absorbers, UV stabilizing agents, dispersants, antioxidants, antistatic agents, lubricants, opacifying agents, anti-foam agents, rheology agents and combinations thereof. In particular embodiments, the e) additives are selected from the group consisting of photo-initiators, thermal free-radical initiators, accelerators, matting agents, wetting agents, dispersants, leveling agents and combinations thereof.

In embodiments, the one-part, curable compositions described herein comprise at least one initiator system comprising at least one photo-initiator or at least one thermal free-radical initiator.

In embodiments, the one-part, curable compositions described herein include at least one photo-initiator and are curable with radiant energy, wherein the photo-initiator may be selected from the group consisting of α-hydroxyketones, phenylglyoxylates, benzyldimethylketals, α-aminoketones, mono-acyl phosphines, bis-acyl phosphines, phosphine oxides, metallocenes and combinations thereof In embodiments, the at least one photo-initiator may be 1-hydroxy-cyclohexyl-phenyl-ketone and/or 2-hydroxy-2-methyl-1-phenyl-1-propanone.

In embodiments, the one-part, curable compositions described herein do not include any initiator and are curable with electron beam energy. In embodiments, the one-part, curable compositions described herein include at least one free-radical initiator and/or accelerator and are curable chemically. The at least one free-radical initiator may comprise a peroxide and/or hydro-peroxide and the accelerator may comprise at least one tertiary amine and/or other reducing agents based on metal salts. In embodiments, the one-part, curable compositions described herein are curable by techniques selected from the group consisting of radiation curable, in particular by UV radiation or electron beam radiation, peroxide curable, heat curable or combination thereof.

In embodiments, a method of coating a substrate with the one-part, curable compositions described herein may comprise, consist of or consist essentially of applying the composition to a substrate and curing the resulting substrate, more particularly, the curing comprising curing by exposure to visible radiation, to UV radiation, to LED radiation, to electron-beam radiation or by exposure to chemicals, in particular organic peroxides. In embodiments, the one-part, curable compositions may be applied to a substrate by spraying, by knife coating, by roller coating, by casting, by drum coating, by dipping and combinations thereof.

In embodiments, the one-part, curable compositions described herein may be used for coatings and/or films, such as coatings and/or films for automotives, aeronautics, cosmetics, small appliances, packaging and/or consumer electronics. More particularly, the resulting coatings or films are soft feel or soft touch coatings or films. In embodiments, the one-part, curable compositions are cured prior to use as coatings and/or films, including curing the composition separately and then applying it as a coating on a substrate or directly curing on the substrate itself used as a coating or coated substrate, for example in applications such as automotives, aeronautics, cosmetics, small appliances, packaging and/or consumer electronics.

In embodiments, the one-part, curable compositions described herein may comprise, consist of or consist essentially of the a) at least one isocyanurate tri(meth)acrylate or derivative thereof; the b) at least one urethane diacrylate; c) the at least one mono functional or difunctional monomer which is different from b) when c) is difunctional; the d) at least one solvent; and the e) at least one additive selected from the group consisting of photo-initiators, free-radical initiators, accelerators, matting agents, wetting agents, dispersants, leveling agents and combinations thereof.

In embodiments, the d) at least one solvent may be selected from the group consisting of ketones, esters, carbonates, alcohols, alkanes, aromatics, ethers, amides and glycol ethers.

In embodiments, the d) at least one solvent is included in an amount sufficient to render the one-part, curable compositions described herein sufficiently low viscous for application to a substrate. "Sufficiently low viscous for application to a substrate" means a viscosity at room temperature (25° C.) of less than 4000 cP (mPa·s) or less than 3500 cP (mPa·s) or less than 3000 cP (mPa·s) or less than 2500 cP (mPa·s) in the case where the solvent d) is present. For example, in embodiments, the one-part, curable compositions described herein have a viscosity at room temperature (25° C.) of less than 4000 cP (mPa·s) or less than 3500 cP (mPa·s) or less than 3000 cP (mPa·s) or less than 2500 cP (mPa·s).

In embodiments, the d) at least one solvent is removed from the one-part, curable compositions described herein before curing. In embodiments, weight percent ranges are referred to after removal of solvent. In embodiments, solvent may be removed by evaporation prior to curing.

In embodiments that do not include solvent d), viscosity of the composition before curing should be less than 65000 cP (mPa·s) at 60° C.

In embodiments, the c) at least one mono functional or difunctional reactive diluent is selected from the group consisting of 1,3-butylene glycol di(meth)acrylate, butanediol di(meth)acrylate, 1,6-hexanediol di(meth)acrylate, alkoxylated hexanediol di-(meth)acrylate, alkoxylated neopentyl glycol di-(meth)acrylate, dodecyl di(meth)acrylate cyclohexane dimethanol di(meth)acrylate, diethylene glycol di(meth)acrylate, dipropylene glycol di(meth)acrylate, acrylate, ethoxylated bisphenol A di(meth)acrylate, ethylene glycol di(meth)acrylate, neopentyl glycol di(meth)acrylate, polyethylene glycol di(meth)acrylate, polypropylene glycol di(meth)acrylate, propoxylated neopentyl glycol diacrylate, tricyclodecane dimethanol diacrylate, triethylene glycol di(meth)acrylate, tetraethylene glycol di(meth)acrylate tripropylene glycol di(meth)-acrylate, 2-(2-ethoxyethoxy) ethyl (meth)acrylate, 2-phenoxyethyl(meth)acrylate, 3,3,5-trimethylcyclohexyl(meth)acrylate, alkoxylated lauryl (meth)acrylate, alkoxylated phenol (meth)acrylate, alkoxylated tetrahydrofurfuryl (meth)acrylate, caprolactone (meth) acrylate, cyclic trimethylolpropane formal (meth)acrylate, dicyclopentadienyl (meth)acrylate, diethylene glycol methyl ether (meth)acrylate, ethoxylated nonyl phenol acrylate, isobornyl (meth)acrylate, isodecyl (meth)acrylate, isooctyl (meth)acrylate, lauryl (meth)acrylate, methoxy polyethylene glycol (meth)acrylate, octyldecyl (meth)acrylate, stearyl (meth)acrylate, tetrahydrofurfuryl (meth)acrylate, tridecyl methacrylate and/or triethylene glycol ethyl ether methacrylate, t-butyl cyclohexyl (meth)acrylate, alkoxylated nonylphenol (meth)acrylate, phenoxyethanol (meth)acrylate, octyl (meth)acrylate, decyl (meth)acrylate, dodecyl (meth) acrylate, tetradecyl (meth)acrylate, tridecyl (meth)acrylate, cetyl (meth)acrylate, hexadecyl (meth)acrylate, behenyl (meth)acrylate, diethylene glycol ethyl ether (meth)acrylate, diethylene glycol butyl ether (meth)acrylate, triethylene glycol methyl ether (meth)acrylate, dodecanediol di-(meth) acrylate, acrylated tert-decanoic acid glycidyl ester, acrylated phenyl glycidyl ether, acrylated $C_{12}/C_{14}$ glycidyl ether, poly(tetramethylene) ether glycol diacrylate and combinations thereof.

Embodiments of the one-part, curable compositions described herein have a desirable soft feel or soft touch and have advantageous properties with respect to properties such as soft feel, tailorability, mar resistance, abrasion resistance, stain resistance and chemical resistance. Embodiments of the one-part, curable compositions described herein are viable for a wide range of applications including automotive, aeronautics, cosmetics, small appliances, packaging and consumer electronics.

DETAILED DESCRIPTION OF THE INVENTION

Embodiments of the one-part, curable compositions described herein may comprise: a) at least one isocyanurate tri(meth)acrylate or derivative thereof; and at least one of components b) to e), wherein: b) is at least one urethane diacrylate; c) is at least one mono functional or difunctional reactive diluent different from b) when c) is difunctional; d) is at least one solvent; and e) is additives. In embodiments, the e) additives may comprise an additive selected from the group consisting of photo-initiators, free radical initiators, accelerators, tri-functional (different from a) or higher functionality (meth)acrylate monomers, polymer waxes or beads, wetting agents, matting agents, colorants dyes, pigments, adhesion promoters, fillers, rheology modifiers, thixotropic agents, plasticizers, UV absorbers, UV stabilizing agents, dispersants, antioxidants, antistatic agents, lubricants, opacifying agents, anti-foam agents, rheology agents and the like and combinations thereof.

A Isocyanurate Tri(meth)Acrylate or Derivative

In embodiments, the a) isocyanurate tri(meth)acrylate or derivative thereof may be, preferably, a derivative of isocyanurate. In embodiments, the a) isocyanurate tri(meth) acrylate or derivative thereof comprises tris-(2-hydroxyethyl)isocyanurate-triacrylate. In embodiments, the a) isocyanurate tri(meth)acrylate or derivative thereof comprises reaction product of 1,6-hexane diisocyanate trimer with an hydroxyl acrylate or isocyanurate tri(meth)acrylate.

In embodiments, the a) at least one isocyanurate tri(meth) acrylate or derivative thereof may be represented by the formula:

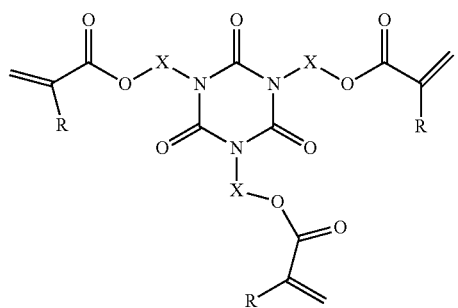

wherein R may be H or Me; and X may be an alkylene chain —$(CH_2)_n$— wherein n=2-10 or X may be an alkylene group further modified by alkoxylation with ethylene oxide or propylene oxide or a combination thereof or X may be an alkylene chain further modified by addition of caprolactone or lactide or a combination thereof.

In embodiments, the a) at least one isocyanurate tri(meth) acrylate or derivative thereof may be represented by the formula:

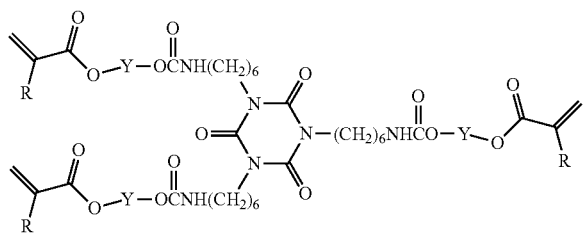

wherein R may be H or Me; and Y may be a branched or linear alkylene group of 2 to 4 carbon atoms or Y may be a branched or linear alkylene group alkoxylated or caprolactone modified alkylene group further modified by alkoxylation with ethylene oxide or propylene oxide or a combination thereof or Y may be an alkylene chain further modified by addition of caprolactone or lactide or a combination thereof. In embodiments, Y may be selected from the group consisting of —$CH_2CH_2$—, —$CH_2CH(CH_3)$—, $CH_2CH_2CH_2$—, —$CH_2CH_2CH_2CH_2$—, alkyl-$(OC_2H_4)_n$—, alkyl-$(OC_2H_3(CH_3))_n$—, alkyl-$[(OC_2H_4)_x(OC_2H_3(CH_3))_y]_n$—, alkyl-$(OC(=O)C_5H_{10})_n$—, alkyl-$(OC(=O)CH(CH_3)OC(=O)CH(CH_3))_n$—, alkyl-$[(OC(=O)C_5H_{10})_x$—$(OC(=O)CH(CH_3)OC(=O)CH(CH_3))_y]_n$ and combinations thereof.

In embodiments, the a) isocyanurate tri(meth)acrylate or derivative thereof may be present in the composition from about 5% to about 80% by weight or from about 10% to about 60% by weight or from about 10% to about 50% by weight or from about 15% to about 50% by weight. In embodiments, the a) isocyanurate tri(meth)acrylate or derivative thereof may be present in the composition, preferably from about 10% to about 50% by weight and most preferably from about 15% to about 50% by weight on the base of a), b), c) and e) (without considering the solvent d)).

In embodiments, the a) isocyanurate tri(meth)acrylate or derivative thereof may have a molecular weight of less than about 10000 or less than about 5000 g/mol or less than about 4000 g/mol or less than about 3000 g/mol or less than about 2000 g/mol or less than about 1000 g/mol. For a polymeric (oligomeric) structure for a), said molecular weight corresponds to Mn value or the number average molecular weight as measured by GPC in THF (tetrahydrofurane). Preferably, the a) isocyanurate tri(meth)acrylate or derivative thereof may have a molecular weight in the range of from about 200 g/mol to about 5000 g/mol or from about 500 g/mol to about 4000 g/mol or from about 1000 g/mol to about 3000 g/mol.

B Urethane Diacrylates

In embodiments, the b) at least one urethane diacrylate is an optional ingredient. In alternative embodiments, the b) at least one urethane diacrylate is contained in the one-part, curable compositions described herein.

In embodiments, the said urethane diacrylate b) which may be both diacrylate or dimethacrylate may be prepared from aliphatic or aromatic diisocyanates, OH group terminated polyester, polyether, polycarbonate, polycaprolactone, polydimethysiloxane or polybutadiene polyols or combinations thereof and capped with (meth)acrylate end-groups.

In embodiments, the b) at least one urethane diacrylate comprises a difunctional aromatic urethane acrylate oligomer, a difunctional aliphatic urethane acrylate oligomer and combinations thereof. In embodiments, a difunctional aromatic urethane acrylate oligomer, such as aromatic polyether urethane diacrylate and aromatic polyester urethane diacrylate may be used as the b) at least one urethane diacrylate. In embodiments, the b) at least one urethane diacrylate comprises a difunctional aliphatic urethane acrylate oligomer, such as aliphatic polyester urethane diacrylate, aliphatic polyether urethane diacrylate, aliphatic polycarbonate urethane diacrylate and aliphatic polyether/polyester urethane diacrylate.

In embodiments, the b) at least one urethane diacrylate may be present in the composition of from about 90% to about 10% by weight or from about 80% to about 20% by weight or from about 75% to about 30% by weight or from about 75% to about 50% by weight on the base of a), b), c) and e) (without considering the solvent d)). In such a case, the weight % sum of present components a)+b) and possibly c) and e) is 100%.

C Monofunctional or Difunctional Reactive Diluent

In embodiments, the c) at least one mono functional or difunctional reactive diluent is an optional ingredient and when c) is difunctional, it is different from b). In alternative embodiments, the c) at least one monofunctional or difunctional reactive diluent is contained in the one-part, curable compositions described herein.

In embodiments, the c) at least one mono functional or difunctional reactive diluent may be selected from the group consisting of 1,3-butylene glycol di(meth)acrylate, butanediol di(meth)acrylate, 1,6-hexanediol di(meth)acrylate, alkoxylated hexanediol di-(meth)acrylate, alkoxylated neopentyl glycol di-(meth)acrylate, dodecyl di(meth)acrylate cyclohexane dimethanol di(meth)acrylate, diethylene glycol di(meth)acrylate, dipropylene glycol di(meth)acrylate, acrylate, ethoxylated bisphenol A di(meth)acrylate, ethylene glycol di(meth)acrylate, neopentyl glycol di(meth)acrylate, polyethylene glycol di(meth)acrylate, polypropylene glycol di(meth)acrylate, propoxylated neopentyl glycol diacrylate, tricyclodecane dimethanol diacrylate, triethylene glycol di(meth)acrylate, tetraethylene glycol di(meth)acrylate tripropylene glycol di(meth)-acrylate, 2-(2-ethoxyethoxy) ethyl (meth) acrylate, 2-phenoxyethyl(meth)acrylate, 3,3,5-trimethylcyclohexyl(meth)acrylate, alkoxylated lauryl (meth)acrylate, alkoxylated phenol (meth)acrylate, alkoxylated tetrahydrofurfuryl (meth)acrylate, caprolactone (meth)acrylate, cyclic trimethylolpropane formal (meth)acrylate, dicyclopentadienyl (meth)acrylate, diethylene glycol methyl ether (meth)acrylate, ethoxylated nonyl phenol acrylate, isobornyl (meth)acrylate, isodecyl (meth)acrylate, isooctyl (meth) acrylate, lauryl (meth)acrylate, methoxy polyethylene glycol (meth)acrylate, octyldecyl (meth)acrylate, stearyl (meth)acrylate, tetrahydrofurfuryl (meth)acrylate, tridecyl methacrylate and/or triethylene glycol ethyl ether methacrylate, t-butyl cyclohexyl (meth)acrylate, alkoxylated nonylphenol (meth)acrylate, phenoxyethanol (meth)acrylate, octyl (meth)acrylate, decyl (meth)acrylate, dodecyl (meth)acrylate, tetradecyl (meth)acrylate, tridecyl (meth)acrylate, cetyl (meth)acrylate, hexadecyl (meth)acrylate, behenyl (meth)acrylate, diethylene glycol ethyl ether (meth)acrylate, diethylene glycol butyl ether (meth)acrylate, triethylene glycol methyl ether (meth)acrylate, dodecanediol di-(meth) acrylate, acrylated tert-decanoic acid glycidyl ester, acrylated phenyl glycidyl ether, acrylated $C_{12}/C_{14}$ glycidyl ether, poly(tetramethylene) ether glycol diacrylate and combinations thereof.

In embodiments, the c) at least one mono functional or difunctional reactive diluent may preferably be selected from the group consisting of 1,6 hexanediol di(meth)acrylate, acrylated tert-decanoic acid glycidyl ester, alkoxylated phenol acrylate, tetrahydrofurfuryl acrylate, cyclic trimethylolpropane formal acrylate, lauryl acrylate, isooctyl acrylate, propoxylated neopentyl glycol diacrylate, polyethylene glycol diacrylate, polypropylene glycol diacrylate and combinations thereof.

In embodiments, the c) at least one mono functional or difunctional reactive diluent may comprise a monofunctional aliphatic urethane acrylate. In embodiments, the c) at least one monofunctional or difunctional reactive diluent may comprise an alkoxylated phenol acrylate. In embodiments, the c) at least one monofunctional or difunctional reactive diluent may comprise an epoxy acrylate oligomer. In embodiments, a difunctional acrylate, such as 1,6 hexane diacrylate or 2PO neopentyl glycol diacrylate may be used as the c) at least one monofunctional or difunctional reactive diluent. In embodiments, an alkoxylated phenol acrylate may be used as the c) at least one monofunctional or difunctional reactive diluent. In embodiments, an epoxy acrylate oligomer, such as aliphatic epoxy monoacrylate, may be used as the c) at least one monofunctional or difunctional reactive diluent. Component c) may be an aliphatic acrylate.

In embodiments, the c) at least one mono functional or difunctional reactive diluent may be present in the composition of from about 1% to about 60% by weight or from about 5% to about 50% by weight or from about 10% to about 40% by weight, on the base of a), b), c) and e) (without considering the solvent d), on the base of a)+b)+c)+e)).

D Solvent

In embodiments, the d) at least one solvent (which is a non-reactive diluent) is an optional ingredient. In alternative embodiments, the d) at least one solvent is contained in the one-part, curable compositions described herein.

In embodiments, the d) at least one solvent may be organic and have an affinity for a resin mixture. In embodiments, the d) at least one solvent may be selected from the group consisting of ketones, esters, carbonates, alcohols, alkanes, aromatics, ethers, amides and glycol ethers. In embodiments, the d) at least one solvent may be a ketone selected from the group consisting of acyclic ketones, cyclic ketones, acetone, methyl ethyl ketone, iso-butyl ethyl ketone and cyclopentanone and the like. In embodiments, the d) at least one solvent may be an ester selected from the group consisting of ethyl acetate, butyl acetate, ethylene glycol methyl ether acetate, ethylene glycol monoethyl ether acetate, ethylene glycol monobutyl ether acetate, propylene glycol methyl ether acetate and the like. In embodiments, the d) at least one solvent may be a carbonate selected from the group consisting of dimethyl carbonate, propylene glycol carbonate, ethylene glycol carbonate and the like. In embodiments, the d) at least one solvent may be an alcohol selected from the group consisting of ethoxy ethanol, methoxy ethanol, 1-methoxy-2-propanol, methyl alcohol, ethyl alcohol, n-propyl alcohol, butyl alcohol, isopropyl alcohol, diacetone alcohol and the like. In embodiments, the d) at least one solvent may be an aromatic selected from the group consisting of xylene, benzene, toluene, ethylbenzene and the like.

In embodiments, the d) at least one solvent may be an alkane selected from the group consisting of hexanes, heptanes and higher than $C_7$ alkanes. In embodiments, the d) at least one solvent may be a glycol ether selected from the group consisting of ethylene glycol monobutyl ether (butyl Cellosolve), ethylene glycol monomethyl ether (2-methoxyethanol), ethylene glycol monoethyl ether (2-ethoxyethanol), ethylene glycol monopropyl ether (2-propoxyethanol), ethylene glycol monoisopropyl ether (2-isopropoxyethanol), ethylene glycol monophenyl ether (2-phenoxyethanol), ethylene glycol monobenzyl ether (2-benzyloxyethanol), diethylene glycol monomethyl ether (methyl carbitol), diethylene glycol monoethyl ether (carbitol cellosolve), diethylene glycol mono-n-butyl ether (2-(2-butoxyethoxy)ethanol), ethylene glycol dimethyl ether, ethylene glycol diethyl ether, ethylene glycol dibutyl ether and the like. In embodiments, the d) at least one solvent may be an ether selected from the group consisting of tetrahydrofuran, dimethyl ether, diethyl ether and the like. In embodiments, the d) at least one solvent may be an amide selected from the group consisting of NMP (N-methylpyrolidinone), DMF (dimethylformamide) and the like.

In embodiments, the d) at least one solvent may comprise an organic solvent such as methyl ethyl ketone (MEK) or butyl acetate (BA). In embodiments, the d) at least one solvent may comprise at least one of MEK and BA. In embodiments, the d) at least one solvent may comprise a 50:50 wt % mixture of MEK and BA.

In embodiments, the d) at least one solvent may be present in the composition of from about 30% to about 70% by weight or from about 35% to about 65% by weight or from about 40% to about 60% by weight or from about 45% to about 55% by weight on the base of a)+b)+c)+d)+e).

E Additives

In embodiments, the e) additives are optional ingredients. In alternative embodiments, the e) additives are contained in the one-part, curable compositions described herein.

In embodiments, the e) additives may comprise an additive selected from the group consisting of photo-initiators, thermal free radical initiators, accelerators, tri- or higher functionality monomers, polymer waxes or beads, leveling agents, wetting agents, matting agents, colorants (e.g., dyes, pigments), slip agents, adhesion promoters, fillers, rheology modifiers, thixotropic agents, plasticizers, UV absorbers, UV stabilizing agents, dispersants, antioxidants, antistatic agents, lubricants, opacifying agents, anti-foam agents, rheology agents and the like and combinations thereof.

In embodiments, the e) additives may comprise additives selected from the group consisting of photo-initiators, thermal free-radical initiators, polymer waxes or beads, accelerators, matting agents, wetting agents, dispersants, leveling agents and combinations thereof. In embodiments, the matting agents may comprise a matting silica, such as Acematt® 3300. In embodiments, the dispersants may comprise a silica dispersant, such as Disperbyk® 2008. In embodiments, the polymer waxes or beads may be micron size beads that aid in giving soft feel, such as beads selected from the group consisting of polyacrylate, polyurethane, polyamide, polyethylene, PTFE (polytetrafluoroethylene) and combinations thereof.

In embodiments, sufficient amounts of an initiator system may be included in the one-part, curable compositions described herein. The initiator system may comprise components that allow for the compositions including the initiator system to be cured with radiant energy, to be cured with electron beam energy and/or to be cured chemically. In embodiments, the one-part, curable compositions described herein comprise the initiator system.

In embodiments, sufficient amounts of an initiator system comprising at least one photo-initiator may be optionally included in the one-part, curable compositions described herein so as to render the compositions curable with radiant energy. Preferably, the compositions may include from about 0.1% by weight to about 20% by weight of the initiator system, preferably about 1% to about 10% by weight on the base of a), b), c) and e) (without considering the solvent d)). Suitable photo-initiators for use in the compositions described herein may include compounds selected from the group consisting of α-hydroxyketones, phenylglyoxylates, benzyldimethylketals, α-aminoketones, mono-acyl phosphines, bis-acyl phosphines, phosphine oxides, metallocenes and combinations thereof. In embodiments, the at least one photo-initiator may be 1-hydroxy-cyclohexyl-phenyl-ketone and/or 2-hydroxy-2-methyl-1-phenyl-1-propanone.

In embodiments, the photo-initiator may be selected from the group consisting of 2-methylanthraquinone, 2-ethylanthraquinone, 2-chloroanthraquinone, 2-benzyanthraquinone, 2-t-butylanthraquinone, 1,2-benzo-9,10-anthraquinone, benzyl, benzoin, benzoin methyl ether, benzoin ethyl ether, benzoin isopropyl ether, alpha-methylbenzoin, alpha-pheylbenzoin, michler's ketone, benzophenone, 4,4'-bis-(diethylamino)-benzophenone, acetophenone, 2,2-diethyloxyacetophenone, diethyloxy-acetophenone, 2-isopropylthioxanthone, thioxanthone, diethyl thioxanthone, 1,5-acetonaphtlene, ethyl-p-dimethylaminobenzoate, benzil ketone, α-hydroxy keto, 2,4,6-trimethyl-benzoyldiphenyl phosphinoxide, benzyl dimethyl ketal, benzil ketal (2,2-dimethoxy-1,2-diphenylethanone), 1-hydroxycylclohexyl phenyl ketone, 2-methyl-1-[4-(methylthio) phenyl]-2-morpholino-propanone-1, 2-hydroxy-2-methyl-1-phenyl-propanone, oligomeric α-hydroxy ketone, phenylbis(2,4,6-trimethylbenzoyl)phosphine oxide, ethyl-4-dimethyl-aminobenzoate, ethyl(2,4,6-trimethylbenzoyl)phenyl phosphinate, acetophenone, anisoin, anthraquinone, anthraquinone-2-sulfonic acid, sodium salt monohydrate, (benzene) tricarbonylchromium, benzil, benzoin isobutyl ether, benzophenone/1-hydroxycyclohexyl phenyl ketone in a 50/50 blend, 3,3', 4,4'-benzophenonetetracarboxylic dianhydride, 4-benzoyl-biphenyl, 2-benzyl-2-(dimethylamino)-4'-morpholino-butyrophenone, 4,4'-bis-(diethylamino)benzophenone, 4,4'-bis(dimethylamino)-benzophenone, camphorquinone, 2-chlorothioxanthen-9-one, dibenzosuberenone, 4,4'-dihydroxybenzophenone, 2,2-dimethoxy-2-phenylacetophenone, 4-(dimethylamino)-benzophenone, 4,4'-dimethyl-benzil, 2,5 -dimethylbenzophenone, 3,4-dimethyl-benzophenone, diphenyl(2,4,6-trimethyl-benzoyl)phosphine oxide and 2-hydroxy-2-methylpropiophenone in a 50/50 blend, 4'-ethoxy-acetophenone, 2,4,6-trimethyl-benzoyldi-phenylphophine oxide, phenyl bis(2,4,6-trimethyl benzoyl) phosphine oxide, ferrocene, 3'-hydroxyacetophenone, 4'-hydroxy-acetophenone, 3 -hydroxybenzophenone, 4-hydroxybenzophenone, 1-hydroxycyclohexyl phenyl ketone, 2-hydroxy-2-methyl-propiophenone, 2-methylbenzophenone, 3-methyl-benzophenone, methybenzoylformate, 2-methyl-4'-(methylthio)-2-morpholino-propiophenone, phenanthrenequinone, 4'-phenoxy-acetophenone, (cumene)-cyclopentadienyl iron(ii) hexafluorophosphate, 9,10-diethoxy and 9,10-dibutoxy-anthracene, 2-ethyl-9,10-dimethoxyanthracene, thioxanthen-9-one and the like.

In embodiments, the one-part, curable compositions described herein do not comprise any initiator and are rendered curable with electron beam energy.

In embodiments, the one-part, curable compositions described herein are mixtures.

In embodiments, sufficient amounts of an initiator system comprising at least one thermal free radical initiator and/or accelerator may be included in the one-part, curable compositions described herein so as to render the compositions as chemically curable. Preferably, the compositions may include from about 0.1% by weight to about 20% by weight of the initiator system, preferably about 1% to about 10% by weight, on the base of a), b), c) and e) (without considering the solvent d)). Suitable free radical initiators for use in the compositions described herein may include azo compounds, peroxides and hydro-peroxides and suitable accelerators may include tertiary amines or other reducing agents based on metal salts. Such chemical curing may also take place at lower temperatures when using accelerators.

In embodiments, methods of applying the one-part, curable compositions described herein may comprise coating the compositions, for example on a substrate and curing the compositions. The coating may take place at ambient temperature or near ambient temperature, such as in the range of 10-35° C. Once applied, the compositions may be cured. Curing techniques are not particularly limited and may include techniques that expose the compositions to polymerization accelerants. Such techniques may include exposure to radiant energy such as visible radiation, UV radiation and LED radiation or by exposure to electron-beam radiation or by exposure to chemicals, in particular organic peroxides.

In embodiments and once a coating of the one-part, curable compositions described herein has been applied, for example to a substrate, the coating may be exposed to radiant energy (e.g., UV light, visible light and/or LED light) or to electron beam energy or to chemicals (in particular organic peroxides and possibly in the presence of an accelerator) for a time effective to cause cross-linking of the a) tri(meth)acrylate derivative of isocyanurate and/or the b) at least one urethane diacrylate and/or the c) at least one mono functional or difunctional reactive diluent. The intensity and/or wavelength may be adjusted as desired to achieve the desired extent of curing. The time period of exposure is not particularly limited, so long as the time period is effective to cure the compositions into a viable article. Time frames for exposure to energy to cause sufficient cross-linking is not particularly limited and may be from at least about 2 minutes or at least about 5 minutes or at least about 10 minutes or at least about 15 minutes or at least about 20 minutes for thermal or chemical cure. In the case of UV/EB cure, this time can range from less than 1 s or up to 10 minutes.

In embodiments, a method of making the one-part, curable compositions described herein may comprise 1) dissolving the desired ingredients in solvent using an overhead mixer with a two-inch propeller blade; 2) adding a photo-initiator and/or dispersant; 3) adding (slowly) silica and mixing until fully dispersed; 4) drawing down the coating to 3 mils on the substrate; 5) drying for about 15 minutes at about 60° C.; 6) curing with at least one mercury arc lamp at 400W/in and a belt speed of 50 fpm; and, optionally, 7) allowing the coated ABS panels to sit overnight.

In embodiments, the one-part, curable compositions described herein are liquid at ambient temperature (25° C.) with a viscosity of less than 4000 cP (mPa·s) or less than 3500 cP (mPa·s) or less than 3000 cP (mPa·s) or less than 2500 cP (mPa·s). The compositions may have viscosities of from about 500 cP (mPa·s) to about 4000 cP (mPa·s) or of from about 1000 cP (mPa·s) to about 3000 cP (mPa·s) or from about 1500 cP (mPa·s) to about 2500 cP (mPa·s) in the case of compositions with solvent d) being present. In embodiments that do not include solvent d), viscosity of the composition before curing should be less than 65000 cP (mPa·s) at 60° C.

Such viscosities of the one-part, curable compositions described herein facilitate easy spreading on a substrate for application as coatings and films. The one-part, curable compositions may be applied in any known conventional manner, for example, by spraying, by knife coating, by roller coating, by casting, by drum coating, by dipping and the like and combinations thereof Indirect application using a transfer process may also be used. A substrate may be any commercially relevant substrate, such as a high surface energy substrate or a low surface energy substrate, such as a metal substrate or plastic substrate, respectively. The substrates may comprise steel or other metal, paper, cardboard, glass, thermoplastics such as polyolefins, polycarbonate, acrylonitrile butadiene styrene and blends thereof, composites, wood, leather and combinations thereof.

The embodiments of the one-part, curable compositions described herein are based on using low molecular weight tri(meth)acrylate derivatives of isocyanurate for a curable soft feel or soft touch coating. Typically, such monomer/oligomers are used for hard scratch and abrasion resistant coatings where haptic or feel properties are not important and it was not expected to be able to incorporate these tri(meth)acrylate derivatives of isocyanurate at higher loadings to create a film that has a soft feel. However, we have surprisingly found that even at very high loadings, the one-part, curable compositions described herein can lead to coatings with soft feel or soft touch properties. The addition of these trimethyl-(meth)acrylate derivatives of isocyanurate in soft feel or soft touch coatings also additionally creates improved properties, such increased abrasion, scratch and solvent resistance.

EXAMPLES

The Examples using the one-part, curable compositions described herein report properties related to feel, hardness, adhesion, abrasion resistance, stain resistance and mar resistance. The properties reported for the Examples were determined using a number of known techniques. Pencil hardness were determined in accordance with ASTM D3363-05. Adhesion was determined in accordance with ASTM D3359-09. Abrasion resistance was determined in accordance with ASTM F2357-10. MEK (mar) resistance was determined in accordance with ASTM D5402-06. Stain resistance was determined in accordance with ANSI/KCMA A161.1 chemical resistance test with ΔE measurements. Stain resistance was also determined in accordance with General Motors sunscreen and insect repellant resistance test procedures, e.g., GMW14445.

Molecular weights were determined by gel permeation chromatography (GPC) in THF using polystyrene calibration standards. Samples were run on an Agilent 1100 Series GPC equipped with HP PLGel® GPC columns and a Hewlett-Packard 1047A® refractive index detector. Results were recorded by Agilent HPLC Chemstation® and analyzed with Polymer Laboratories GPC software. Viscosities were measured with a Brookfield viscometer, model DV-II, at 25° C. using a 27 spindle and speed was varied depending on viscosity, typically between 50 and 200 rpm. For each of the Examples, the compositions were applied on standard ABS panels with a target thickness of 36 μm. The solvent was flashed off at 60° C./15 minutes. The coatings were cured 1×50 feet per minute (15.24 m/min) using two Mercury vapor 400W lamps. The ABS panels exhibited a soft feel, characterized as "silky," "velvety" or "rubbery", good adhesion on ABS (6×6 crosshatch) and good resistance to solvent. The coatings of the Examples were compared to commercially available two-part urethane soft feel coatings and were rated by experienced observers on type of feel (rubbery, velvety, silky) and softness (1=no soft feel, 5=best soft feel).

The compositions of Examples 1-4 are listed below in Table 1, whereby ingredients and weight information are provided for Examples 1-4. It is noted that Table 1 is directed to oligomer diacrylates for the b) at least one urethane diacrylate.

TABLE 1

Ingredients for one-part, curable compositions

| Component | Product | Silky 1 (Example 1) | Silky 2 (Example 2) | Velvety 1 (Example 3) | Rubbery (Example 4) |
|---|---|---|---|---|---|
| a | isocyanurate tri(meth)acrylate | 16 g | 16 g | 10 g | 7 g |
| b | Aromatic polyester urethane diacrylate | 24 g | 12 g | 15 g | 16.5 g |
| b | aliphatic polyether urethane diacrylate | 0 g | 12 g | 15 g | 16.5 g |
| e | amorphous, fumed silica | 3.4 g | 3.4 g | 3.4 g | 3.4 g |
| e | Disperbyk® 2008 (structured acrylic copolymer dispersant) | 0.35 g | 0.35 g | 0.35 g | 0.35 g |
| e | 2-hydroxy-2-methyl-1-phenyl-1-propanone | 2.0 g | 2.0 g | 2.0 g | 2.0 g |
| d | 50:50 methyl ethyl ketone:butyl acetate | 57.2 g | 57.2 g | 57.2 g | 57.2 g |

The compositions of Example 5 are listed below in Table 2, whereby ingredients and weight information is provided for Example 5. It is noted that Table 2 is directed to monomeric diacrylates for the b) at least one urethane diacrylate. ABS panels with the one-part, curable composition of Example 5 were prepared in a similar manner to the ABS panels with the one-part, curable composition of Examples 1-4.

TABLE 2

Ingredients for one-part, curable compositions

| Component | Product | Velvety 2 (Example 5) |
|---|---|---|
| a | reaction product of 1,6-hexane diisocyanate trimer with an hydroxyl acrylate | 24 g |
| b | alkoxylated phenol acrylate | 14 g |
| b | 2PO neopentyl glycol diacrylate | 4 g |
| e | amorphous, fumed silica | 3.4 g |
| e | Disperbyk® 2008 (structured acrylic copolymer dispersant) | 0.35 g |
| e | 2-hydroxy-2-methyl-1-phenyl-1-propanone | 2.0 g |
| d | 50:50 methyl ethyl ketone:butyl acetate | 57.2 g |

A comparative Example is also provided and is directed to a two-part system comprising isocyanate and a difunctional polyol in solvent or water. The comparative Example employed 87.45 g of ST2010 clear resin (available from The Alsa Corporation) with 22.05 g of ST2010 hardener (also available from The Also Corporation). ABS panels with the two-part, curable composition of the comparative Example were prepared in a similar manner to the ABS panels with the one-part, curable composition of Examples 1-5.

Table 3 is provided below and includes test results for Examples 1-5 and the comparative Example with respect to certain properties, such as feel, pencil hardness, adhesion and abrasion resistance.

TABLE 3

Properties of Examples 1-5 and the Comparative Example

| | Feel | Overall feel (5 = best) | Pencil Hardness | Adhesion | Abrasion Resistance |
|---|---|---|---|---|---|
| Silky 1 (Ex. 1) | silky | 4 | H | 100 | 300 |
| Velvety 1 (Ex. 3) | velvety | 4 | B | 100 | 69 |
| Silky 2 (Ex. 2) | silky | 4 | F | 100 | 221 |
| Rubbery (Ex. 4) | rubbery | 3.5 | B | 100 | 65 |
| Velvety 2 (Ex. 5) | velvety | 4.5 | B | 100 | 32 |
| Comparative Example | rubbery | 5 | <9B | 100 | 43 |

Table 4 is provided below and includes test results for Examples 1-5 and the comparative Example with respect to stain resistance to multiple products and mar (MEK) resistance.

TABLE 4

Properties of Examples 1-5 and the Comparative Example

| | Stain Resistance to Coffee ($\Delta E$) | Stain Resistance to Mustard ($\Delta E$) | Stain Resistance to Ketchup ($\Delta E$) | Stain Resistance to Red Wine ($\Delta E$) | MEK Resistance (double rubs) |
|---|---|---|---|---|---|
| Silky 1 (Ex. 1) | 9.52 | 17.29 | 2.23 | 12.71 | 200+ |
| Velvety 1 (Ex. 3) | 13.95 | 17.89 | 4.59 | 22.5 | 67 |
| Silky 2 (Ex. 2) | 13.46 | 15.79 | 2.91 | 17.66 | 167 |
| Rubbery (Ex. 4) | 9.99 | 18.63 | 2.67 | 16.38 | 40 |
| Velvety 2 (Ex. 5) | 16.87 | 14.82 | 4.37 | 16.09 | 171 |
| Comparative Example | 16.78 | 20.11 | 5.64 | 21.79 | 15 |

Table 5 is provided below and includes test results for Examples 1-5 and the comparative Example with respect to material resistance to multiple products.

TABLE 5

Properties of Examples 1-5 and the Comparative Example

| | Material Resistance To Sunscreen Rating | Material Resistance to Insect Repellant Rating |
|---|---|---|
| Silky 1 (Ex. 1) | 2 | 2 |
| Velvety 1 (Ex. 3) | 2 | 2 |
| Silky 2 (Ex. 2) | 2 | 2 |
| Rubbery (Ex. 4) | 2 | 2 |
| Velvety 2 (Ex. 5) | 2 | 1.5 |
| Comparative Example | 2 | 2 |

As can be seen from Tables 3-5, the one-part, curable compositions described herein perform better in the areas tested when compared to conventional two-part compositions.

The one-part, curable compositions described herein are preferably deposited on a substrate by spraying. The one-part, curable compositions described herein may be formulated to yield a solvent resistant coating with a variety of touch sensations from "rubbery" to "silky" by varying the amount of component a).

When the word "about" is used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages.

It will now be apparent that new, improved and nonobvious compositions have been described in this specification with sufficient particularity as to be understood by one of ordinary skill in the art. Moreover, it will be apparent to those skilled in the art that modifications, variations, substitutions and equivalents exist for features of the compositions which do not materially depart from the spirit and scope of the embodiments disclosed herein. Accordingly, it is expressly intended that all such modifications, variations, substitutions and equivalents which fall within the spirit and scope of the invention as defined by the appended claims shall be embraced by the appended claims.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The invention claimed is:

1. A cured coating or film resulting from curing a one-part, curable composition comprising:
    a) at least one isocyanurate tri(meth)acrylate or derivative thereof;
    b) at least one urethane diacrylate selected from the group consisting of an aromatic polyester urethane diacrylate, an aliphatic polyester urethane diacrylate, an aliphatic polycarbonate urethane diacrylate, and an aliphatic polyether/polyester urethane diacrylate;
    c) at least one monofunctional or difunctional reactive diluent different from b);
    d) optionally, at least one solvent; and
    e) optionally, additives, wherein the a) at least one isocyanurate tri(meth)acrylate or derivative thereof is present in the composition from 15% to 50% by weight based on said components a), b), c), and, when present, e), and wherein the cured coating or film is a soft-touch coating or film, wherein the composition has a viscosity at room temperature (25° C.) of less than 4000 cPs (mPa.s).

2. The cured, soft-touch coating or film of claim 1, wherein the a) at least one isocyanurate tri(meth)acrylate or derivative thereof comprises tris(2-hydroxyethyl)isocyanurate triacrylate.

3. The cured, soft-touch coating or film of claim 1, wherein the composition comprises the d) at least one solvent.

4. The cured, soft-touch coating or film of claim 1, wherein the composition comprises the e) additives, wherein the additives are selected from the group consisting of photo-initiators, thermal free radical initiators, accelerators, tri- or higher functionality monomers, polymer waxes or beads, leveling agents, wetting agents, matting agents, colorants, dyes, pigments, slip agents, adhesion promoters, fillers, rheology modifiers, thixotropic agents, plasticizers, UV absorbers, UV stabilizing agents, dispersants, antioxidants, antistatic agents, lubricants, opacifying agents, anti-foam agents, rheology agents and combinations thereof.

5. The cured, soft-touch coating or film of claim 4, wherein the e) additives are selected from the group consisting of photo- initiators, thermal free-radical initiators, polymer waxes or beads, accelerators, matting agents, wetting agents, dispersants, leveling agents and combinations thereof.

6. The cured, soft-touch coating or film of claim 1, wherein the composition is curable by radiation, by exposure to chemicals, heat or combinations thereof.

7. The cured, soft-touch coating or film of claim 1, wherein the a) at least one isocyanurate tri(meth)acrylate or derivative thereof has a molecular weight of less than about 10000 g/mol.

8. The cured, soft-touch coating or film of claim 1, wherein the composition comprises:
the d) at least one solvent; and the e) at least one additive, wherein the at least one additive is selected from the group consisting of photo-initiators, free-radical initiators, accelerators, matting agents, wetting agents, dispersants, leveling agents and combinations thereof.

9. The cured, soft-touch coating or of claim 1, wherein: the a) at least one isocyanurate tri(meth)acrylate or derivative thereof is represented by the formula:

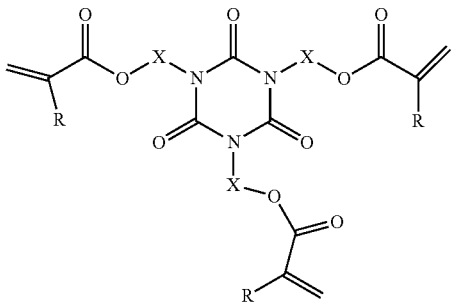

wherein R is H or Me; and
X is an alkylene chain —$(CH_2)_n$— wherein n=2–10 or X is an alkylene group further modified by alkoxylation with ethylene oxide or propylene oxide or a combination thereof or X is an alkylene chain further modified by addition of caprolactone or lactide or a combination thereof; or
the a) at least one isocyanurate tri(meth)acrylate or derivative thereof is represented by the formula:

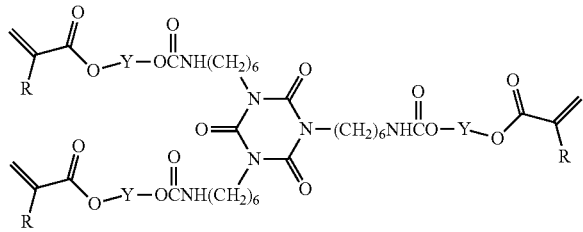

wherein R is H or Me; and
Y is a branched or linear alkylene group of 2 to 4 carbon atoms or Y is a branched or linear alkylene group alkoxylated or caprolactone modified alkylene group further modified by alkoxylation with ethylene oxide or propylene oxide or a combination thereof or Y is an alkylene chain further modified by addition of caprolactone or lactide or a combination thereof.

10. The cured, soft-touch coating or film of claim 9, wherein Y is selected from the group consisting of —$CH_2CH_2$—, —$CH_2CH(CH_3)$—, $CH_2CH_2CH_2$—, —$CH_2CH_2CH_2CH_2$—, alkyl-$(OC_2H_4)_n$—, alkyl-$(OC_2H_3(CH_3))_n$—, alkyl-$[(OC_2H_4)_x(OC_2H_3(CH_3))_y]_n$—, alkyl-$(OC(=O)C_5H_{10})_n$—, alkyl-$(OC(=O)CH(CH_3)OC(=O)CH(CH_3))_n$—, alkyl-$[(OC(=O)C_5H_{10})_x$—$(OC(=O)CH(CH_3)OC(=O)CH(CH_3))_y]_n$ and combinations thereof.

11. The cured, soft-touch coating or film of claim 1, wherein the a) at least one isocyanurate tri(meth)acrylate or derivative thereof is tris(2-hydroxyethyl) isocyanurate triacrylate.

12. The cured, soft-touch coating or of claim 1, wherein the c) at least one monofunctional or difunctional reactive diluent is selected from the group consisting of 1,3-butylene glycol di(meth)acrylate, butanediol di(meth)acrylate, 1,6-hexanediol di(meth)acrylate, alkoxylated hexanediol di(meth)acrylate, alkoxylated neopentyl glycol di(meth)acrylate, dodecyl di(meth)acrylate cyclohexane dimethanol di(meth)acrylate, diethylene glycol di(meth)acrylate, dipropylene glycol di(meth)acrylate, acrylate, ethoxylated bisphenol A di(meth)acrylate, ethylene glycol di(meth)acrylate, neopentyl glycol di(meth)acrylate, polyethylene glycol di(meth)acrylate, polypropylene glycol di(meth)acrylate, propoxylated neopentyl glycol diacrylate, tricyclodecane dimethanol diacrylate, triethylene glycol di(meth)acrylate, tetraethylene glycol di(meth)acrylate tripropylene glycol di(meth)-acrylate, 2-(2-ethoxyethoxy) ethyl (meth)acrylate, 2-phenoxyethyl(meth)acrylate, 3,3,5-trimethylcyclohexyl (meth)acrylate, alkoxylated lauryl (meth)acrylate, alkoxylated phenol (meth)acrylate, alkoxylated tetrahydrofurfuryl (meth)acrylate, caprolactone (meth)acrylate, cyclic trimethylolpropane formal (meth)acrylate, dicyclopentadienyl (meth)acrylate, diethylene glycol methyl ether (meth)acrylate, ethoxylated nonyl phenol acrylate, isobornyl (meth) acrylate, isodecyl (meth)acrylate, isooctyl (meth) acrylate, lauryl (meth)acrylate, methoxy polyethylene glycol (meth) acrylate, octyldecyl (meth)acrylate, stearyl (meth)acrylate, tetrahydrofurfuryl (meth)acrylate, tridecyl methacrylate and/or triethylene glycol ethyl ether methacrylate, t-butyl cyclohexyl (meth)acrylate, alkoxylated nonylphenol (meth) acrylate, phenoxyethanol (meth)acrylate, octyl (meth)acrylate, decyl (meth)acrylate, dodecyl (meth)acrylate, tetradecyl (meth)acrylate, tridecyl (meth)acrylate, cetyl (meth) acrylate, hexadecyl (meth)acrylate, behenyl (meth)acrylate, diethylene glycol ethyl ether (meth)acrylate, diethylene glycol butyl ether (meth)acrylate, triethylene glycol methyl ether (meth)acrylate, dodecanediol di- (meth)acrylate, acrylated tert-decanoic acid glycidyl ester, acrylated phenyl glycidyl ether, acrylated C12/C14 glycidyl ether, poly(tetramethylene) ether glycol diacrylate and combinations thereof.

13. The cured, soft-touch coating or film of claim 1, wherein the composition comprises the d) at least one solvent and the at least one solvent is selected from the group consisting of methyl ethyl ketone, butyl acetate and combinations thereof.

14. A method of coating a substrate comprising:
applying the one-part, curable composition of claim 1 to a substrate; and
curing the resulting substrate.

15. The method of claim 14, wherein the curing step comprises curing by exposure to visible radiation, to UV radiation, to LED radiation, to electron-beam radiation or by exposure to chemicals.

16. The method of claim 14, wherein the applying comprises applying to a substrate by spraying, by knife coating, by roller coating, by casting, by drum coating, by dipping and combinations thereof.

17. The method of claim 14, wherein the substrate is selected from the group consisting of steel or other metals, paper, cardboard, glass, thermoplastics, composites, wood, leather and combinations thereof.

18. The method of preparing a coating and/or a film comprising using the one-part, curable composition of claim 1.

19. The method of claim 18, wherein the coating and/or film is for a soft feel or a soft touch coating and/or film.

20. The method of claim 18, wherein said coating and/or film is for automotives, aeronautics, cosmetics, small appliances, packaging and/or consumer electronics.

21. A cured article comprising the cured, soft-touch coating or film of claim 1.

* * * * *